United States Patent
Kreitmair-Steck

(10) Patent No.: US 9,152,165 B2
(45) Date of Patent: Oct. 6, 2015

(54) COUNTERBALANCED CONTROL STICK SYSTEM

(71) Applicant: AIRBUS HELICOPTERS DEUTSCHLAND GMBH, Donauworth (DE)

(72) Inventor: Wolfgang Kreitmair-Steck, Munich (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 393 days.

(21) Appl. No.: 13/682,884

(22) Filed: Nov. 21, 2012

(65) Prior Publication Data

US 2013/0133465 A1    May 30, 2013

(30) Foreign Application Priority Data

Nov. 28, 2011    (EP) .................................... 11400054

(51) Int. Cl.
*H04Q 5/22*    (2006.01)
*G05G 1/04*    (2006.01)
*B64C 13/10*    (2006.01)
*B64C 27/56*    (2006.01)
*G05G 9/047*    (2006.01)

(52) U.S. Cl.
CPC    *G05G 1/04* (2013.01); *B64C 13/10* (2013.01); *B64C 27/56* (2013.01); *G05G 9/047* (2013.01); *Y02T 50/44* (2013.01); *Y10T 74/20474* (2015.01)

(58) Field of Classification Search
CPC ...................................................... G05G 9/047
USPC ............................... 74/471 XY, 504; 340/10.4
See application file for complete search history.

(56) References Cited

U.S. PATENT DOCUMENTS

| | | | |
|---|---|---|---|
| 4,349,708 A * | 9/1982 | Asher ............................ | 200/6 A |
| 4,367,373 A * | 1/1983 | McDaniel et al. ........ | 74/471 XY |
| 4,477,043 A | 10/1984 | Repperger | |
| 5,002,241 A | 3/1991 | Tizac | |
| 5,735,490 A | 4/1998 | Berthet | |
| 6,863,144 B2 * | 3/2005 | Brandt et al. ................. | 180/333 |
| 2008/0079381 A1 | 4/2008 | Hanlon | |

(Continued)

FOREIGN PATENT DOCUMENTS

| | | |
|---|---|---|
| DE | 202008015384 U1 | 1/2009 |
| WO | 9503213 A1 | 2/1995 |
| WO | 9503566 A1 | 2/1995 |

OTHER PUBLICATIONS

Search Report and Written Opinion; Application No. EP 11400054; dated May 3, 2012.

*Primary Examiner* — Hai Phan
*Assistant Examiner* — Zhen Y Wu
(74) *Attorney, Agent, or Firm* — Brooks Kushman P.C.

(57) ABSTRACT

A counterbalanced control stick system for a vehicle comprising: a shaft (2) rotationally mounted in a casing (22) and a joystick (1). Said joystick (1) is pivotably mounted and has a handgrip section (23). The opposed section of said joystick (1) is linked by said resilient means (10, 10.2) to adjustable fixing points (11.1). A plate (11) is provided offset from the joystick (1) is movable relative to said casing (22). The adjustable fixing points (11.1) are controlled by said movable plate (11). An angle sensor (7) is provided for detection of any angular moves of the shaft (2). Electronics (25) are provided to which signals generated by the rotation angle sensors are supplied. The signals are digitized and differing detected values are harmonized.

20 Claims, 16 Drawing Sheets

(56) References Cited

U.S. PATENT DOCUMENTS

| | | |
|---|---|---|
| 2009/0189024 A1 | 7/2009 | Hors |
| 2009/0230252 A1 | 9/2009 | Daunois |
| 2010/0123045 A1 | 5/2010 | Grieser |
| 2011/0108130 A1* | 5/2011 | Schultz et al. .................. 137/14 |
| 2011/0148666 A1* | 6/2011 | Hanlon et al. ................ 340/971 |

* cited by examiner

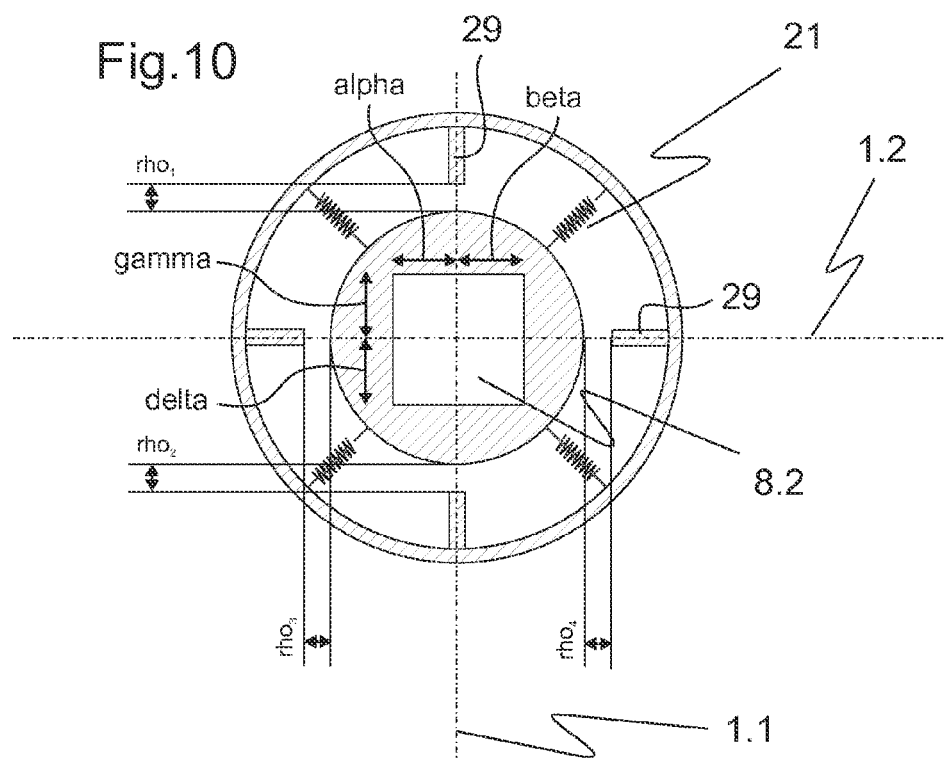
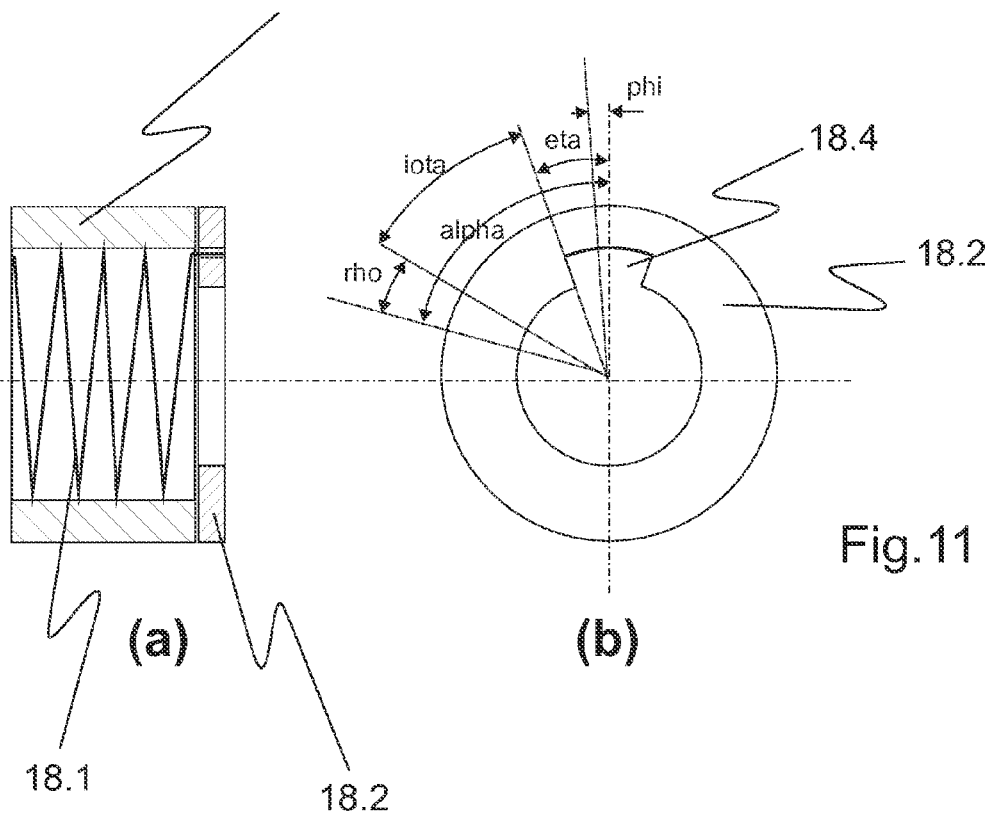

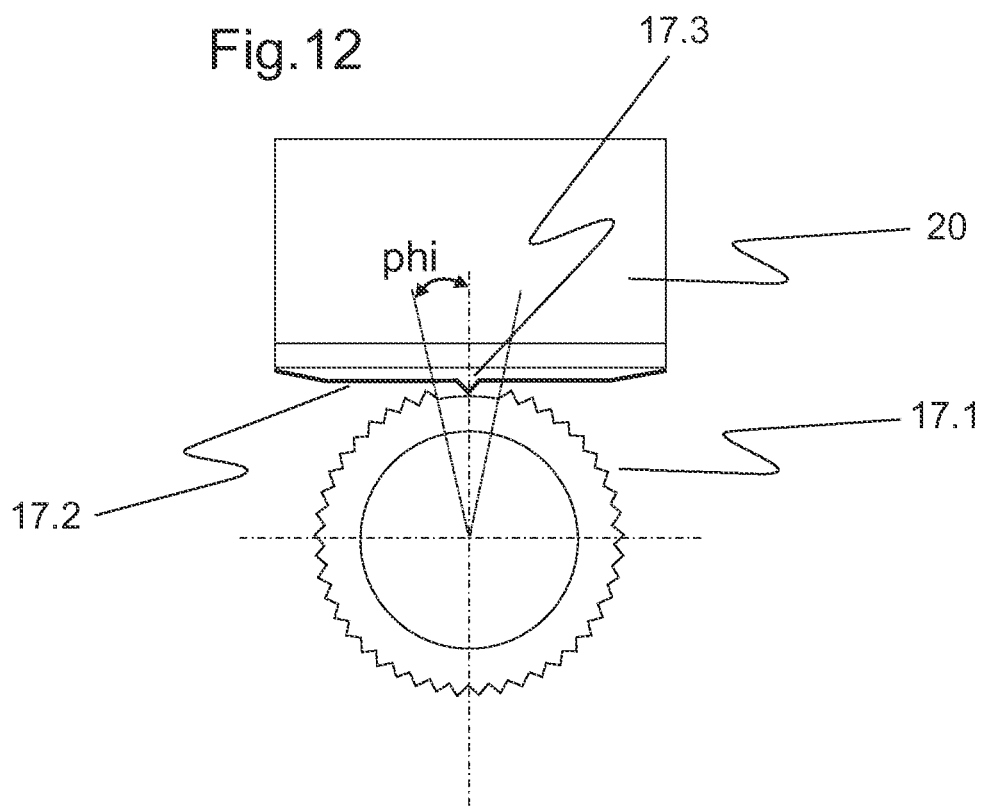
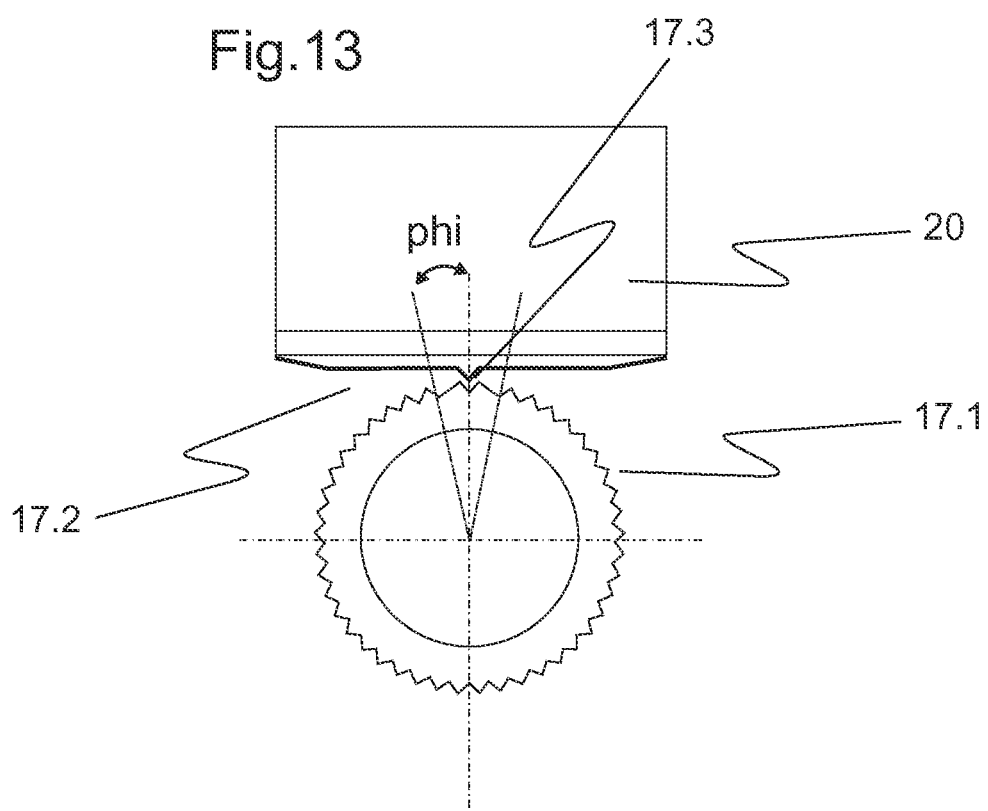

(a)　　　　(b)

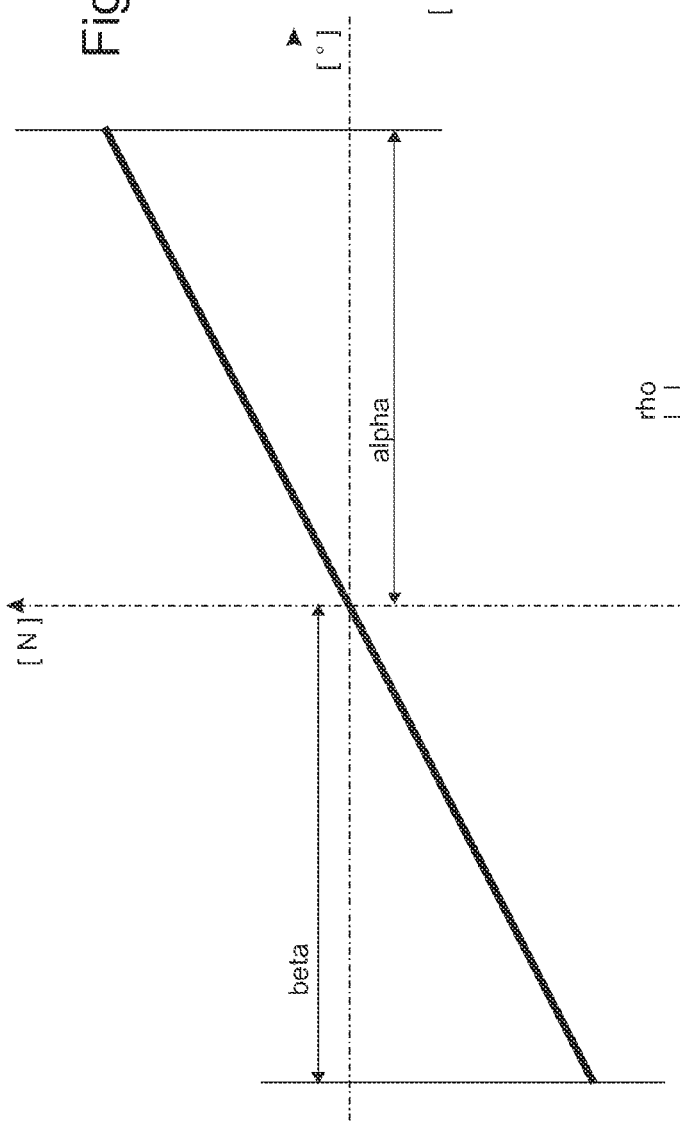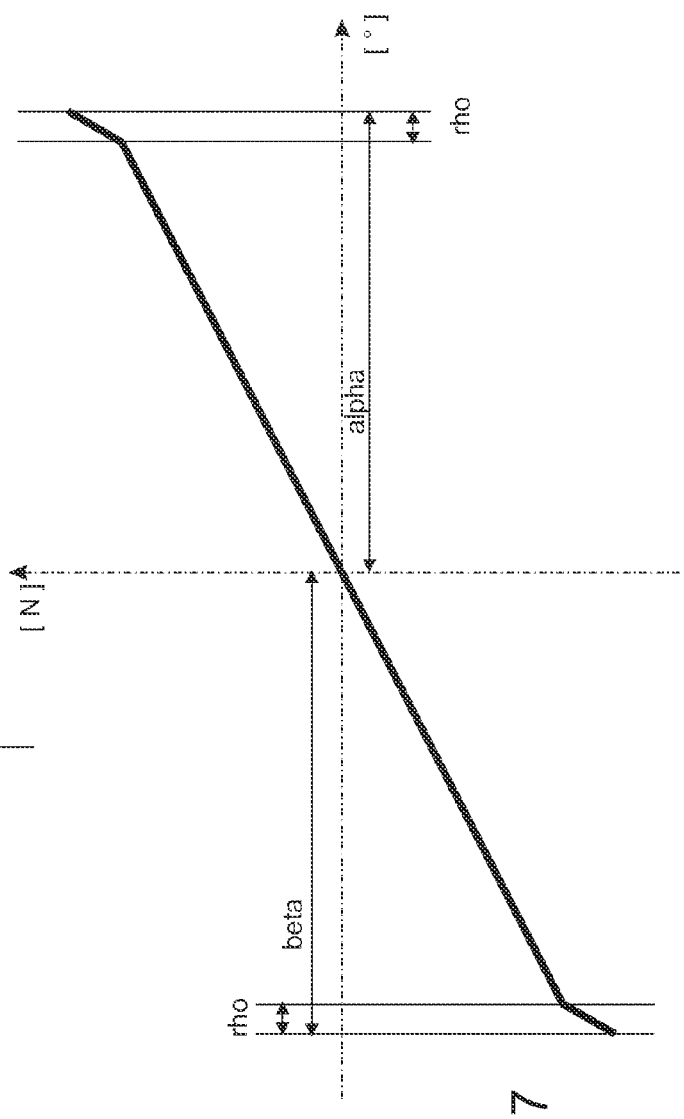

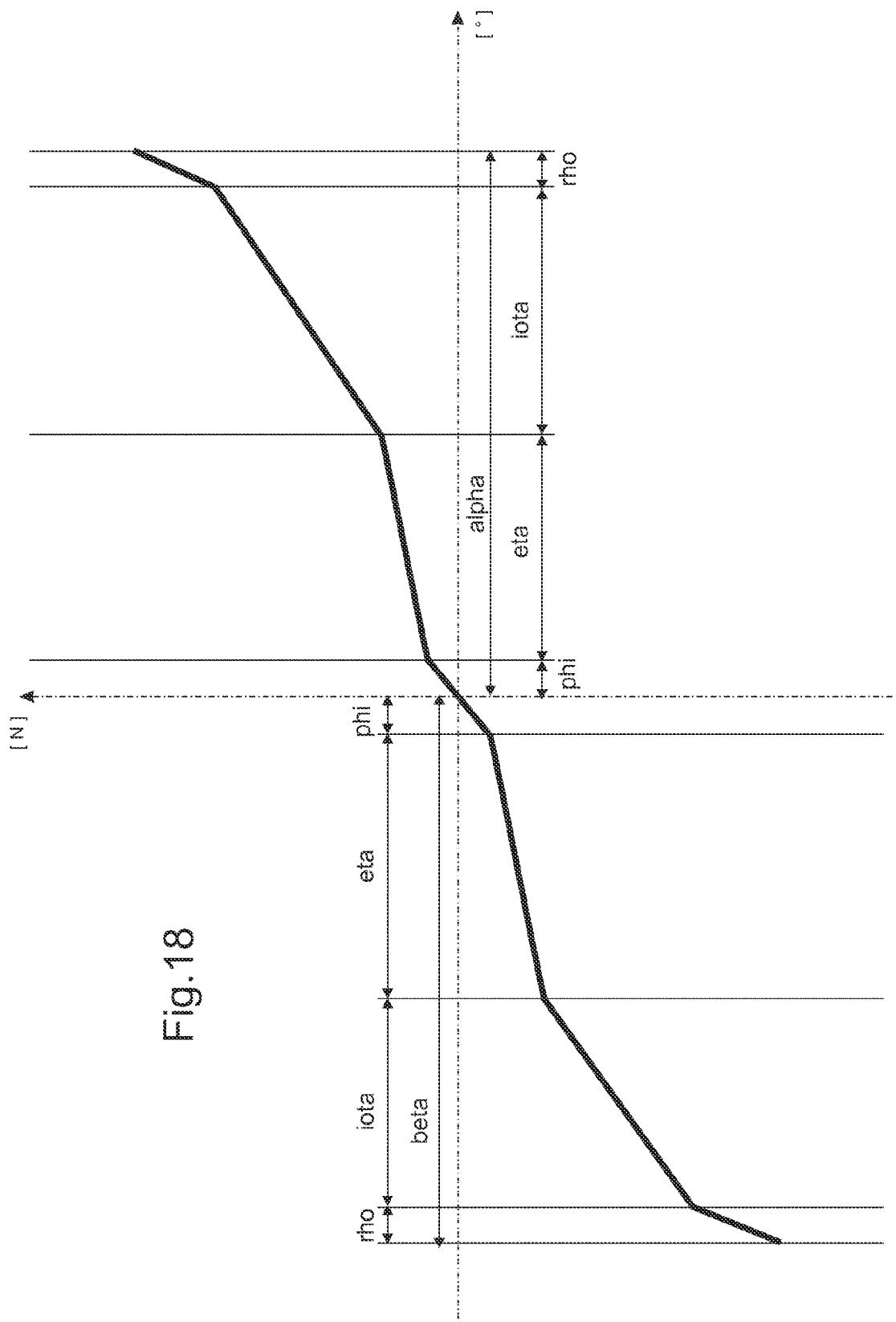

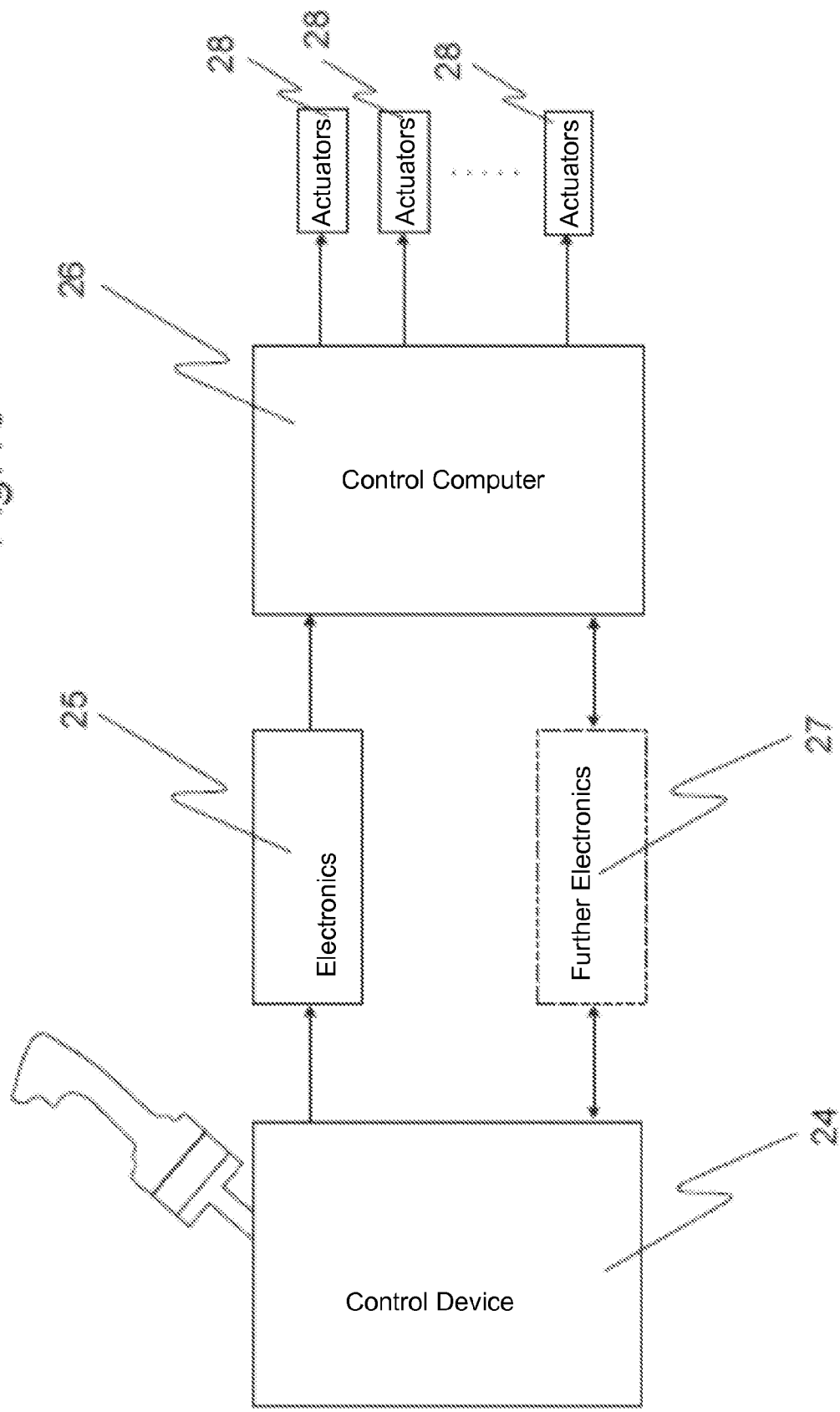

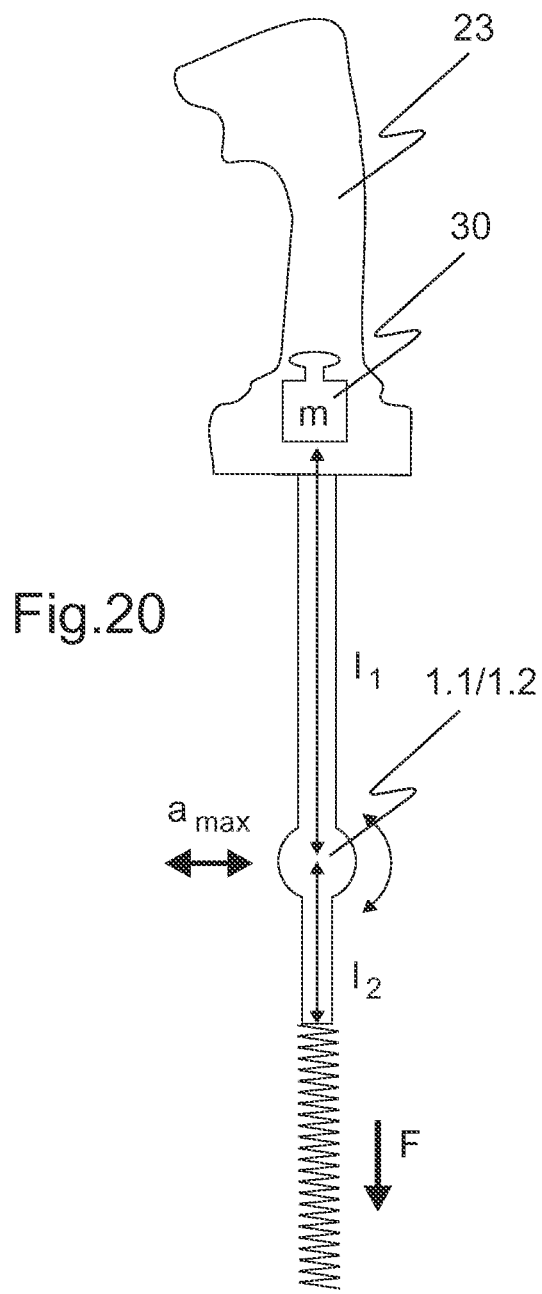

COUNTERBALANCED CONTROL STICK SYSTEM

CROSS-REFERENCE TO RELATED APPLICATIONS

This application claims priority to European patent application No. EP 11 400054.0 filed Nov. 28, 2011, the disclosure of which is incorporated in its entirety by reference herein.

BACKGROUND OF THE INVENTION (1) Field of the Invention

The invention relates to a counterbalanced control stick system for a vehicle, particularly to a control stick system for an air vehicle with the features of the preamble of claim 1, such control stick systems being related to proportional joysticks for the control of powered movers and, more particularly, to comprehensive systems and methods for providing an operator with feedback related to the actual control of the object(s) being moved. Some aspects of the invention also relate to applications, components and methods associated with such control stick systems of air vehicles, particularly helicopters.

(2) Description of Related Art

Powered movers can be found in a huge variety in air vehicles and many of said powered movers use proportional controls in the form of a joystick or an equivalent type of lever or knob that controls actuators to do the powered moving. Actuators are often hydraulic but may also come in other forms such as electric, pneumatic, electro-magnetic or some combination thereof.

It is a problem to control the actuators to actuate the movers to desired positions without overshooting and/or correcting. Overshooting an intended position can be hazardous for the air vehicle. Without sophisticated controls that are common today, powered movers can be very jerky.

The document WO 9503213 A1 discloses a method for operating aircraft, in which two aircrafts are controlled by a common control arrangement to fly parallel courses within a common ATC slot.

The document WO 9503566 A1 discloses a control device with a control stick, wherein the control stick is moved by an irreversible actuator controlled by a computer and the computer controls the position of the actuator and thus the movement of the control stick and slaves the control column position to the force applied, in accordance with force data and position data by means of a force/position law entered in the computer.

The document DE 20 2008 015 384 U1 discloses a device for controlling vehicles having a manual control unit configured to influence the direction of movement of a vehicle. The manual control unit provides, in a neutral position of the manual control unit, a trim point to determine a preferred direction of movement. The device further includes a force generating device, generating at least one force acting in the direction of the neutral position of the manual control unit; a trim coupling operable to reduce the at least one force acting on the manual control unit; and a trim control unit configured to store and retain the trim point existing prior to an operation of the trim coupling.

The document US 2008079381 A1 discloses an active user interface assembly with a user interface and one or more feedback motors coupled to the user interface. The one or more feedback motors, when energized, supply a feedback force to the user interface that opposes user interface movement. One of the feedback motors is disposed such that its center of gravity is located at a position relative to the user interface to mass balance the user interface when it is in the null position. The configurations allow for the center of gravity of a feedback motor to be positioned in a manner that alleviates the need for counterbalance weights.

The document US 2010123045 A1 discloses a device for controlling vehicles having a manual control unit configured to influence the direction of movement of a vehicle. The manual control unit provides, in a neutral position of the manual control unit, a trim point to determine a preferred direction of movement. The device further includes a force generating device, generating at least one force acting in the direction of the neutral position of the manual control unit; a trim coupling operable to reduce the at least one force acting on the manual control unit; and a trim control unit configured to store and retain the trim point existing prior to an operation of the trim coupling.

The document U.S. Pat. No. 4,477,043 A discloses an improvement to an aircraft control stick. Movement of an aircraft may generate a force which undesirably causes the aircraft pilot to deflect the aircraft's control stick, which thereby results in the aircraft deviating from the desired flight path. A processor-based system employs an algorithm that generates a signal for causing the control stick to resist such forces. A spring and damper are connected to the control stick so that the spring constant and damping ratio may be varied.

The document US2009230252 A1 discloses an aircraft flight control including a control stick with a handle and a root that are interconnected by an intermediate segment of the control stick. The flight control includes a pitch shaft and a roll shaft that are mutually perpendicular, the control stick passing through an oblong orifice formed in the pitch shaft, the root being mechanically connected to the roll shaft by a mechanical connection, while the intermediate segment is connected to the pitch shaft via a connection pin that passes through the intermediate segment and that is arranged axially in the oblong orifice.

The document U.S. Pat. No. 5,002,241 A discloses a device for controlling elements of a machine, comprising a stick intended to be actuated by a single hand of an operator and mounted for tilting about at least one axis transversal to said stick, said stick being associated with at least one position sensor and delivering an electric signal representative of tilting of said stick about said axis, on each side of a neutral position, said electric signal controlling at least one actuator which controls at least one of said elements of the machine. This device is characterized in that said stick is mounted for rotation on itself about its longitudinal axis and in that it comprises at least one other position sensor delivering another electric signal representative of rotation of said stick about itself, on each side of a neutral position, said other electric signal controlling at least one other actuator which controls at least one other element of said machine.

The document US2009189024 A1 discloses a device for remotely controlling the control surfaces of an aircraft, the device comprising: an actuator member pivotable about an axis and entraining a rotary shaft; a stationary finger parallel to the shaft and supported at a radial distance from the shaft; a moving finger secured to the shaft and supported at a radial distance therefrom, both fingers being parallel to the shaft; a first slab supported at a radial distance from the shaft beside the two fingers on one side thereof and suitable for turning about the axis of the shaft; a second slab supported at a radial distance from the shaft beside the two fingers on their side opposite from the first slab, and suitable for turning about the axis of the shaft; a third slab supported at a radial distance from the shaft beside the second slab at an angular distance therefrom and suitable for turning about the axis of the shaft; a first spring between the first and second slabs; and a second spring between the first and third slabs.

The solutions of the cited state of the art are generally conceived to deal with specific needs of control.

BRIEF SUMMARY OF THE INVENTION

The object of the invention is to provide a counterbalanced control stick system for a vehicle, particularly a counterbalanced control stick system for an air vehicle, that allows adjustment to different needs, and still further particularly a counterbalanced manual control stick system for an air vehicle that allows adjustment of the relation between force and angular travel of at least one control axis. A further object of the invention is to provide a counterbalanced manual control stick system for a vehicle, particularly a counterbalanced manual control stick system for an air vehicle that allows mechanic limitation of said angular travel. A still further object of the invention is to provide a counterbalanced manual control stick system for a vehicle, particularly a counterbalanced manual control stick system for an air vehicle that allows reliable operability. A still further object of the invention is to provide a counterbalanced manual control stick system for a vehicle, particularly a counterbalanced manual control stick system for an air vehicle that allows attenuation of control input and independence of the counterbalanced manual control stick system from exterior influences such as acceleration of the vehicle or air vehicle.

The solution is provided with a counterbalanced control stick system for a vehicle, particularly a counterbalanced control stick system for an air vehicle with the features of claim 1. Preferred embodiments of the invention are presented with the subclaims.

According to the invention a counterbalanced control stick system for a vehicle, particularly a control stick system for an air vehicle, comprises a joystick with a longitudinal axis. The inventive counterbalanced control stick system further comprises a shaft mounted rotatable in a casing. The joystick is pivotable mounted to said rotatable shaft. Said joystick is provided with a handgrip section on a first side relative to said shaft and said joystick is further provided with an opposed section on a second side opposed to said first side of said shaft. Said opposed section of said joystick is linked to counterbalancing resilient means. At least one angle sensor is provided at the shaft and/or the joystick respectively for precise detection of any angular moves of the shaft and/or the joystick. An adjustable plate is provided, said plate being offset from the joystick. Said resilient means are linked to at least one fixing point adjustable by moving said plate relative to the casing and thus relative to the pivoting axis of the joystick. The inventive counterbalanced control stick system is set up as a modular kit of exchangeable constructive elements allowing composition of all or most of said exchangeable constructive elements of the modular kit to more or less complex embodiments of the inventive counterbalanced control stick system for different needs with different characteristics. The inventive counterbalanced control stick system allows control with tactile feedback for intuitive interpretation and adjustment by a user of the joystick for a reliable control with neutrally-biased joystick controllers of the type that effect a null velocity when the joystick is positioned in a neutral position, said neutral position being invariant under all conditions controlled by the joystick. The inventive counterbalanced control stick system is adapted to resist to horizontal accelerations as they are to be expected for helicopters. The control device is provided to supply signals generated by the rotation angle sensors to electronics, where the signals are digitized and differing detected values are harmonized.

According to a preferred embodiment of the invention a screw is provided, said screw controlling the movement of the plate within the casing relative to the joystick and thus allows adjustment of the pretension of the at least one spring attached to the plate and in this way the adjustment of the force feedback presetting.

According to a further preferred embodiment of the invention further angle sensors at the shaft and/or the joystick respectively render the precise detection of said angular moves redundant and thus increase the reliability of the angular detection.

According to a further preferred embodiment of the invention said at least one fixing point for the spring is fix relative to the shaft and coupled to further resilient means, said further resilient means being adjustable by means of said movable plate to allow separation of the angular moves of the joystick from the angular moves of the shaft and thus allow avoidance of any influence of the angular moves of the joystick to the angular moves of the shaft.

According to a further preferred embodiment of the invention said resilient means are two, three or four helical springs to allow passive force feedback and mass balance of the joystick.

According to a further preferred embodiment of the invention said resilient means are two pairs of springs each pair associated to an angular movement of said joystick to either of the longitudinal axis or the shaft axis. In case of breakdown of one spring of each respective pair the remaining spring of said respective pair provides sufficient redundancy to take the inventive control stick system back to 0°, if the joystick is released. Said further preferred embodiment of the invention with two pairs of springs thus allows ongoing operability of the inventive control stick system after a breakdown of one spring of each respective pair.

According to a further preferred embodiment of the invention a supplemental rotational spring and/or a bent leaf spring is/are associated to the shaft. The supplemental rotational spring allows a supplemental spring force against rotation of the shaft after a predetermined angle eta has been reached while the bent leaf spring provides for an increased effort to overcome the threshold of an angle phi. The supplemental rotational spring and/or the bent leaf spring according to the invention allow to flag haptically a so called neutral area of control inputs, said neutral area indicating the angle range to be covered before any control inputs from the joystick are taken into account.

According to a further preferred embodiment of the invention a gear pattern is provided on the rotational shaft to create a feeling for the angle range covered by the supplemental rotational spring and/or the bent leaf spring interacting with the rotated shaft.

According to a further preferred embodiment of the invention an element anchored to said movable plate is provided and said resilient means is a further spring linked with its first end to said opposed section of said joystick and with its other end to a central point of said element anchored to said movable plate. The further spring serves as a supplemental redundancy feature in case of a breakdown of any of the other springs linked between joystick and movable plate.

According to a further preferred embodiment of the invention a motor is provided said motor driving clockwise or counter clockwise the screw to control actively the movement of the plate relative to the joystick for defined and dynamic modifications of the efforts needed for any rotational moves of the joystick and thus allowing for active force feedback.

According to a further preferred embodiment of the invention a cover is provided on the casing with a passage, said passage limiting with its inner circumference the angular range of the joystick, said inner circumference being preferably provided with at least one soft stop.

According to a further preferred embodiment of the invention the joystick is provided with a vibrator/shaker to provide an alarm in case of a control input leading to dangerous angle ranges.

Other aspects of the invention combine such tactile feedback with active influence on the control of the subject whenever the joystick is forced to a position outside of its actual-control-biased position.

According to a further preferred embodiment of the invention further electronics are provided for a counterbalanced manual control stick system to provide control signals to the motor and register any feedback from said motor, if applicable. A control computer processes the data from electronics and further electronics to control data for transfer to actuators and feedback to further electronics.

BRIEF DESCRIPTION OF THE SEVERAL VIEWS OF THE DRAWINGS

For a more complete understanding of the invention and its preferred embodiments, and the advantages thereof, reference is now made to the following descriptions taken in conjunction with the accompanying drawings, in which:

FIG. 10 is a top view of a further extract of the preferred embodiments of the counterbalanced control stick system according to any of FIGS. 1-4 of the invention;

FIGS. 11a, 11b are respective cross-sectional views of a further extract of the preferred embodiments of the counterbalanced control stick system according to any of FIGS. 2-4 of the invention;

FIG. 12 is a lateral view of a further extract of the preferred embodiments of the counterbalanced control stick system according to any of FIGS. 2-4 and FIG. 6 of the invention;

FIG. 13 is a lateral view of a modification of the further extract of the preferred embodiments of the counterbalanced control stick system according to any of FIGS. 2-4 and FIG. 6 of the invention;

FIG. 16 shows a graph of a force-angular travel relation of the counterbalanced control stick system according to FIG. 1 and FIG. 9a of the invention;

FIG. 17 shows a graph of a force-angular travel relation of the counterbalanced control stick system according to FIG. 1 and FIG. 10 of the invention;

FIG. 18 shows a graph of a force-angular travel relation of the counterbalanced control stick system according to FIG. 2 and FIG. 10 of the invention;

FIG. 19 shows the counterbalanced control stick system with integrated control electronics according to the invention; and FIG. 20 shows a schematic presentation for calculations of the pretension for the counterbalanced control stick system according to the invention.

DETAILED DESCRIPTION OF THE INVENTION

Figure 1:
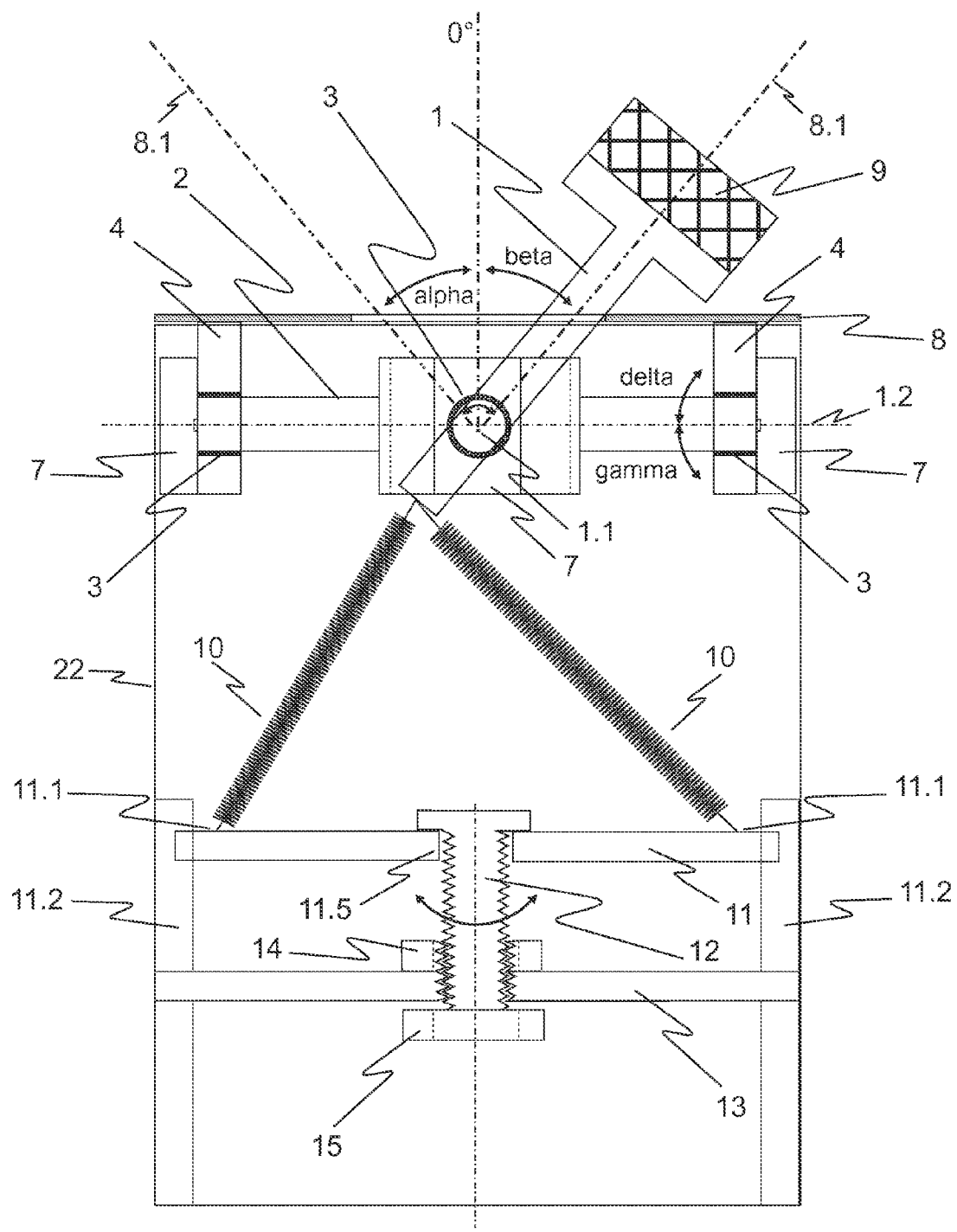
FIG. 1 is a schematic cross-sectional view of a counterbalanced control stick system according to the invention.

According to FIG. 1 a counterbalanced control stick system for a vehicle (not shown), particularly a counterbalanced control stick system for an air vehicle, comprises a joystick 1 with a transversal axis 1.1 and a shaft 2 with a shaft axis 1.2 rotationally mounted in a casing 22. The casing 22 is provided with a cover 8 and an essentially circular side wall. The cover 8 is fixed to the casing 22 and provided with a central opening 8.2 (see FIG. 9). The joystick 1 is shown in its two most inclined longitudinal positions 8.1 relative to the transversal axis 1.1 allowed by the inner circumference of said central opening 8.2 of cover 8.

The shaft 2 is rotatably held in two opposed bearings 4 supported by the cover 8 of the casing 22. The joystick 1 is pivotably held in a ball-, roller- or journal-bearing 3 coaxially supported by said shaft 2 for rotational freedom of said joystick 1 relative to said rotational shaft axis 1.2 for angular movements around the transversal axis 1.1 of said joystick 1 in a first plane and said shaft axis 1.2 in the respective orthogonal plane. The joystick 1 and the coaxially supporting shaft 2 are held in the ball-, roller- or journal-bearings 3 in such a way that any rotation of said joystick 1 in the first plane around transversal axis 1.1 is independent to said movement of the shaft around shaft axis 1.2 in the orthogonal plane. In this way the joystick 1 can reach by rotation any position inside of the central opening 8.2.

Sensor means 7 are provided coaxially at either of the respective ends of the shaft axis 1.2 to detect any angular movements of said shaft 2 around its shaft axis 1.2 and sensor means 7 are provided coaxially at either of the respective ends of the ball-, roller- or journal-bearing 3 to detect any angular movements of said joystick 1 relative to said transversal axis 1.1. The second sensor means 7 at the respective ends of the shaft axis 1.2 and the second sensor means 7 at the respective ends of the transversal axis 1.1 are optional for redundant detection of any angular movements in any direction of said joystick 1.

Figure 15:
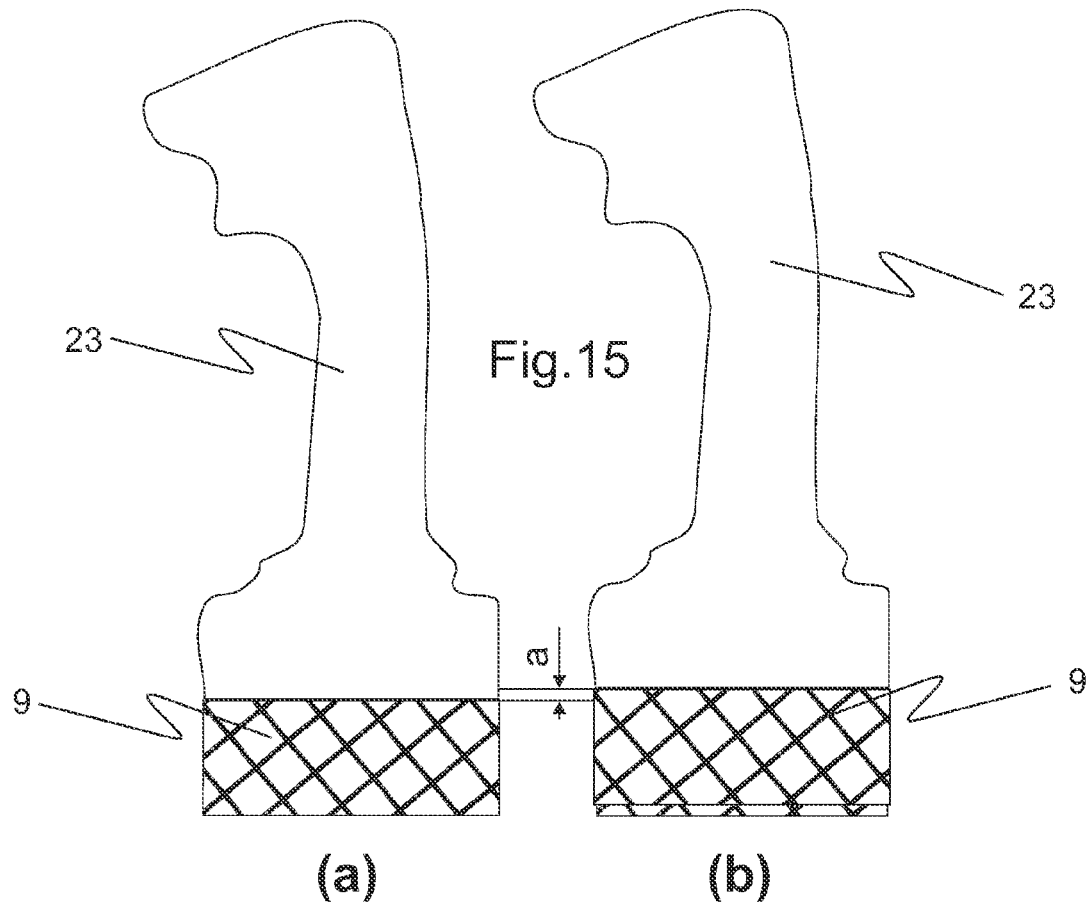
FIGS. 15a, 15b are respective lateral views of a joystick of the counterbalanced control stick system according to the invention.

The joystick 1 is provided with a shaker/vibrator 9 adjacent to a handgrip section (see FIG. 15) on a first side relative to said shaft 2. The joystick 1 is further provided with an opposed section on a second side opposed to said first side relative to said shaft 2. Helical springs 10 as resilient means are attached to said opposed section of said joystick 1 and said helical springs 10 are linked respectively to fixing points 11.1 on an adjustable plate 11 offset from the joystick 1. The adjustable plate 11 is movable relatively to said casing 22 up and down along guide rails 11.2 next to the sidewalls.

The movable plate 11 is driven by a central screw 12. Said central screw 12 passes through a smooth opening 11.5 of the movable plate 11 and said central screw 12 withholds with an upper flange the movable plate 11 against the biasing force from the helical springs 10. A plate 13 is fixed relative to the casing 22. Said plate 13 is provided with a central threaded hole interacting with the thread of the screw 12. Screw 12 can be made to move up and down rectangular relative to plate 13 by turning a head 15 of the screw 12. Screw 12 can be blocked relative to plate 13 by tightening a jam nut 14 of screw 12.

Figure 2:
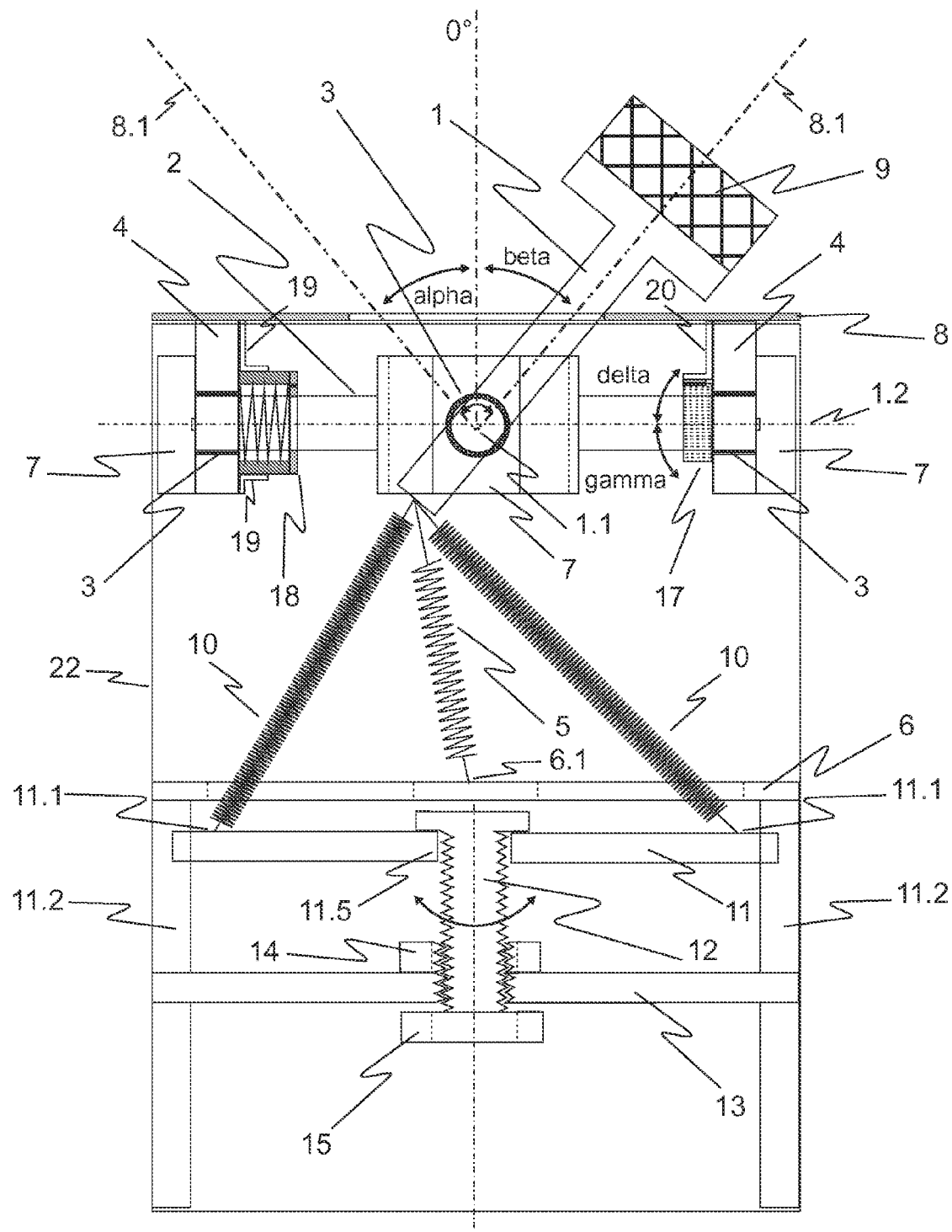
FIG. 2 is a schematic cross-sectional view of a preferred embodiment of the counterbalanced control stick system according to the invention.

According to FIG. 2 corresponding features are referred to with the references of FIG. 1. A preferred embodiment of the counterbalanced control stick system is provided with a supplemental rotational spring 18 next to one of the bearings 4 and coaxial to the shaft 2. The supplemental rotational spring 18 is supported in a housing 19 mounted to the bearing 4. For details of the interaction between the supplemental rotational spring 18 and the shaft 2 reference is made to FIG. 11. A bent leaf spring 17 is associated coaxially to the shaft 2 next to the opposite bearing 4. The bent leaf spring 17 is held by a support 20 mounted to the bearing 4 and/or the cover 8. For details of the interaction between the bent leaf spring 17 and the shaft 2 reference is made to FIG. 12-14.

An anchored element 6 is set on top of guide rails 11.2 and on top of said movable plate 11. A redundancy spring 5 is linked with its first end to said opposed section of said joystick 1 and with its other end to a central point 6.1 of said anchored element 6. The anchored element 6 is provided with passages to allow passage of the helical springs 10 to the fixing points 11.1 of plate 11. For details of the anchored element 6 reference is made to FIG. 7.

Figure 3:
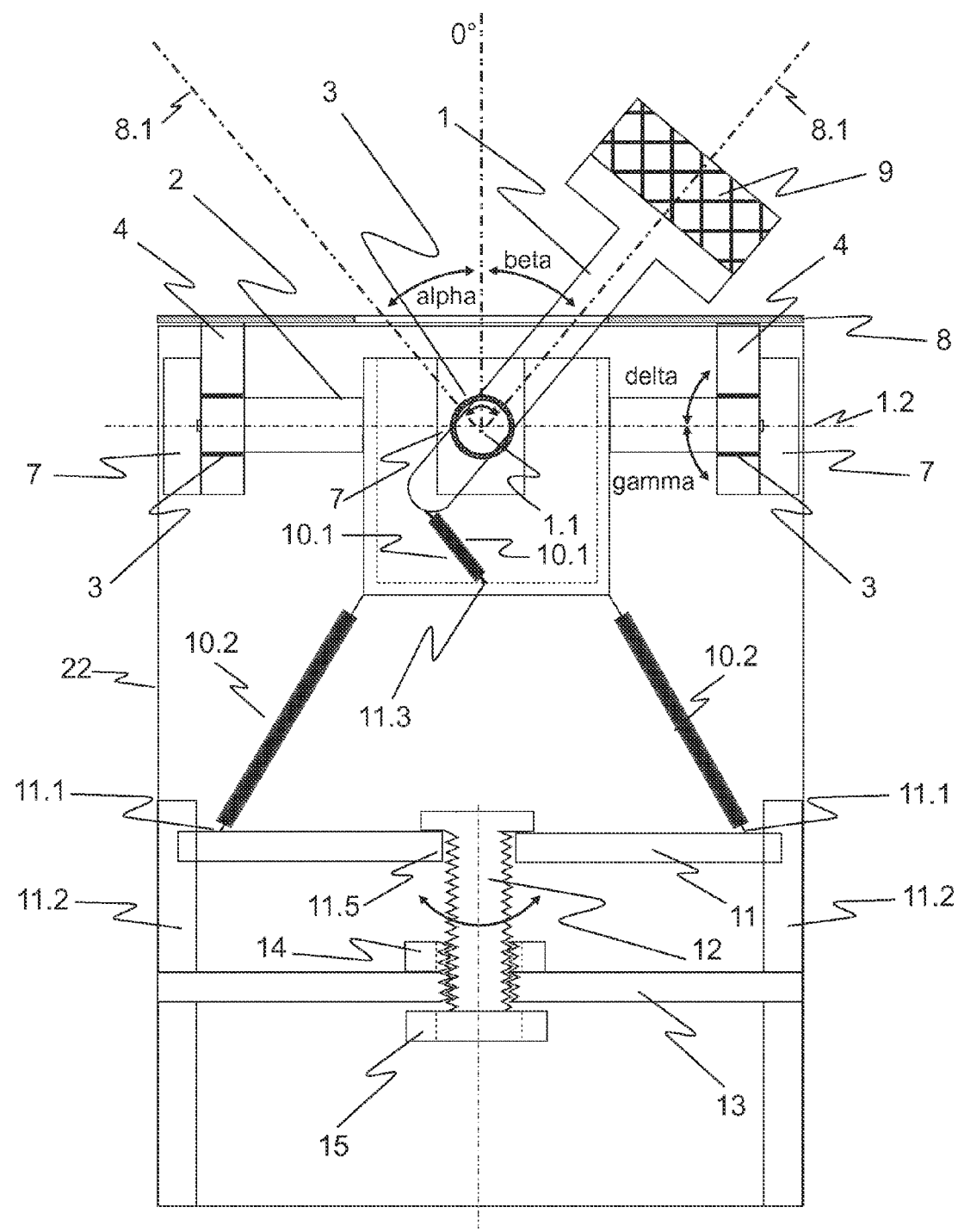
FIG. 3 is a schematic cross-sectional view of a further preferred embodiment of the counterbalanced control stick system according to the invention.

According to FIG. 3 corresponding features are referred to with the references of FIG. 1, 2. A further preferred embodiment of the counterbalanced control stick system is provided with two helical decoupling springs 10.1 extending from said opposed section of said joystick 1 to at least one shaft point 11.3 that is fix relative to the shaft 2 and said at least one shaft point 11.3 is coupled in series to further helical springs 10.2, any pretension of said further helical springs 10.2 being adjustable by means of said movable plate 11. The decoupling springs 10.1 decouple any pivoting movements of the joystick 1 from the reactions of the helical springs 10.2 due to any angular movements of the shaft 2.

Any movements of the adjustable table 11 towards or away from the joystick 1, linked directly to the helical springs 10.2 results exclusively in a modification of the control characteristics with regard to angular movements of the shaft 2. The control characteristics with regard to any pivoting movements of the joystick 1 remain unchanged in spite of movements of the adjustable table 11.

Figure 4:
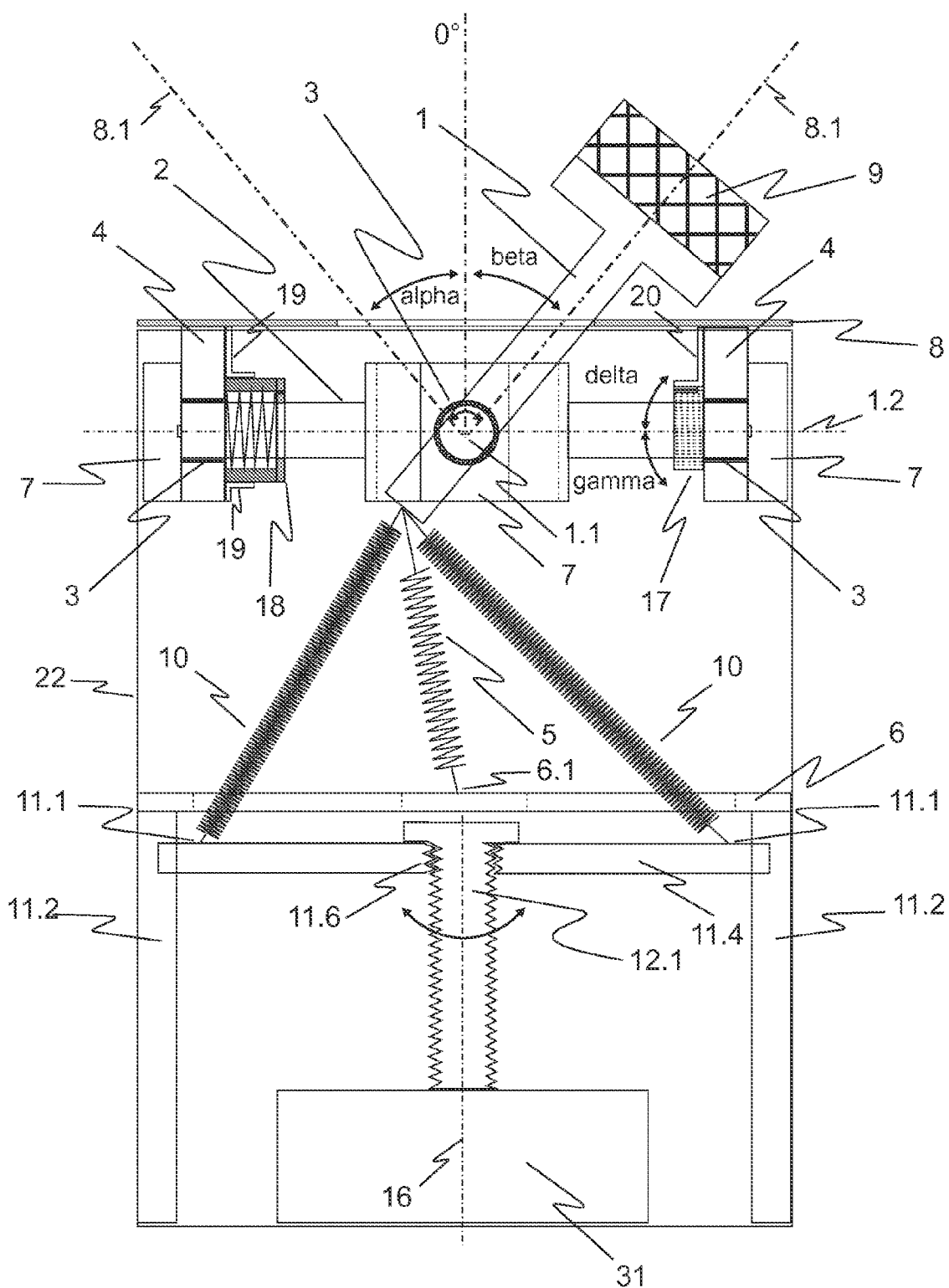
FIG. 4 is a schematic cross-sectional view of a still further preferred embodiment of the counterbalanced control stick system according to the invention.

According to FIG. 4 corresponding features are referred to with the references of FIG. 1-3. A still further preferred embodiment of the counterbalanced control stick system is provided with a motor 31 driving the screw 12.1 by turning clockwise or counter-clockwise to move the plate 11.4 up and down along the common central axis 16 of the motor 31, the screw 12.1 and the plate 11.4. The screw 12.1 is held within a coaxial threaded hole 11.6 of the plate 11.4 to be driven by the motor 31 according to the desired control characteristics.

Figure 5:
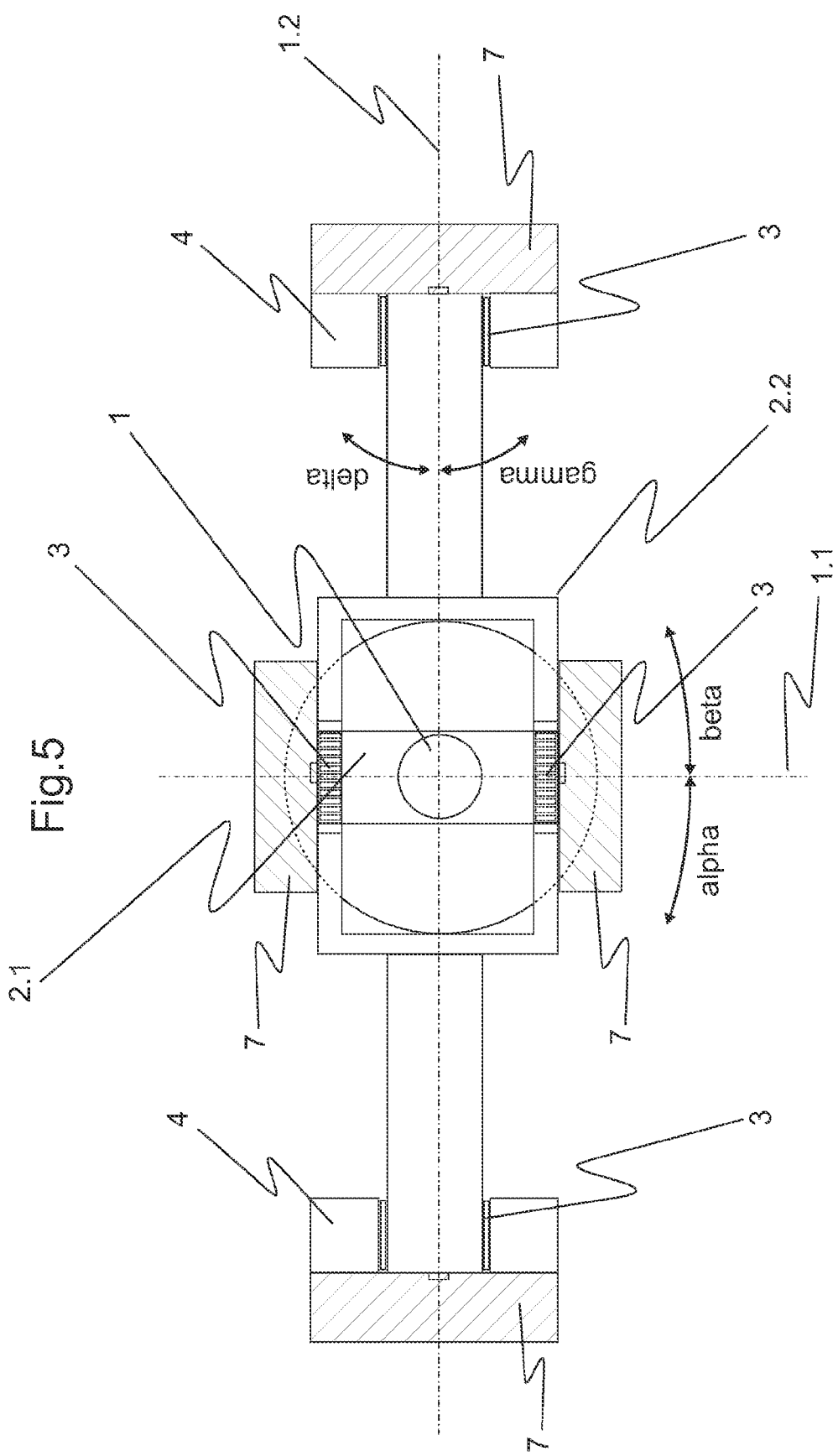
FIG. 5 is a schematic top view of an extract with the shaft and the joystick of the counterbalanced control stick system according to the invention.

According to FIG. 5 corresponding features are referred to with the references of FIG. 1-4. The joystick 1 of the counterbalanced control stick system is supported by the shaft 2 with the rotational shaft axis 1.2. The shaft 2 is rotatably held in the two opposed bearings 4 and ball-, roller- or journal-bearings 3. The joystick 1 is pivotably held in the ball-, roller- or journal-bearing 3 coaxially supported by said shaft 2 for rotational freedom of said joystick 1 relative to said rotational shaft axis 1.2 for angular movements around the rotational axis 1.1 of said joystick 1. The joystick 1 is held by means of an axle 2.1 in the ball-, roller- or journal-bearing 3 coaxially supported by said shaft 2 in such a way that any rotation of said joystick 1 around rotational shaft axis 1.2 results in corresponding angular movements of said shaft 2 around its shaft axis 1.2. The ball-, roller- or journal-bearing 3 is mounted into a cage 2.2, said cage 2.2 being symmetrical with respect to shaft axis 1.2 and the rotational axis 1.1

Sensor means 7 are provided coaxially at either of the respective ends of the shaft 2 to detect any angular movements "gamma", "delta" of said shaft 2 around its shaft axis 1.2 and sensor means 7 are provided coaxially at either of the respective ends of the ball-, roller- or journal-bearing 3 to detect any angular movements "alpha", "beta" of said joystick 1 relative to said joystick axis 1.1.

Figure 6:
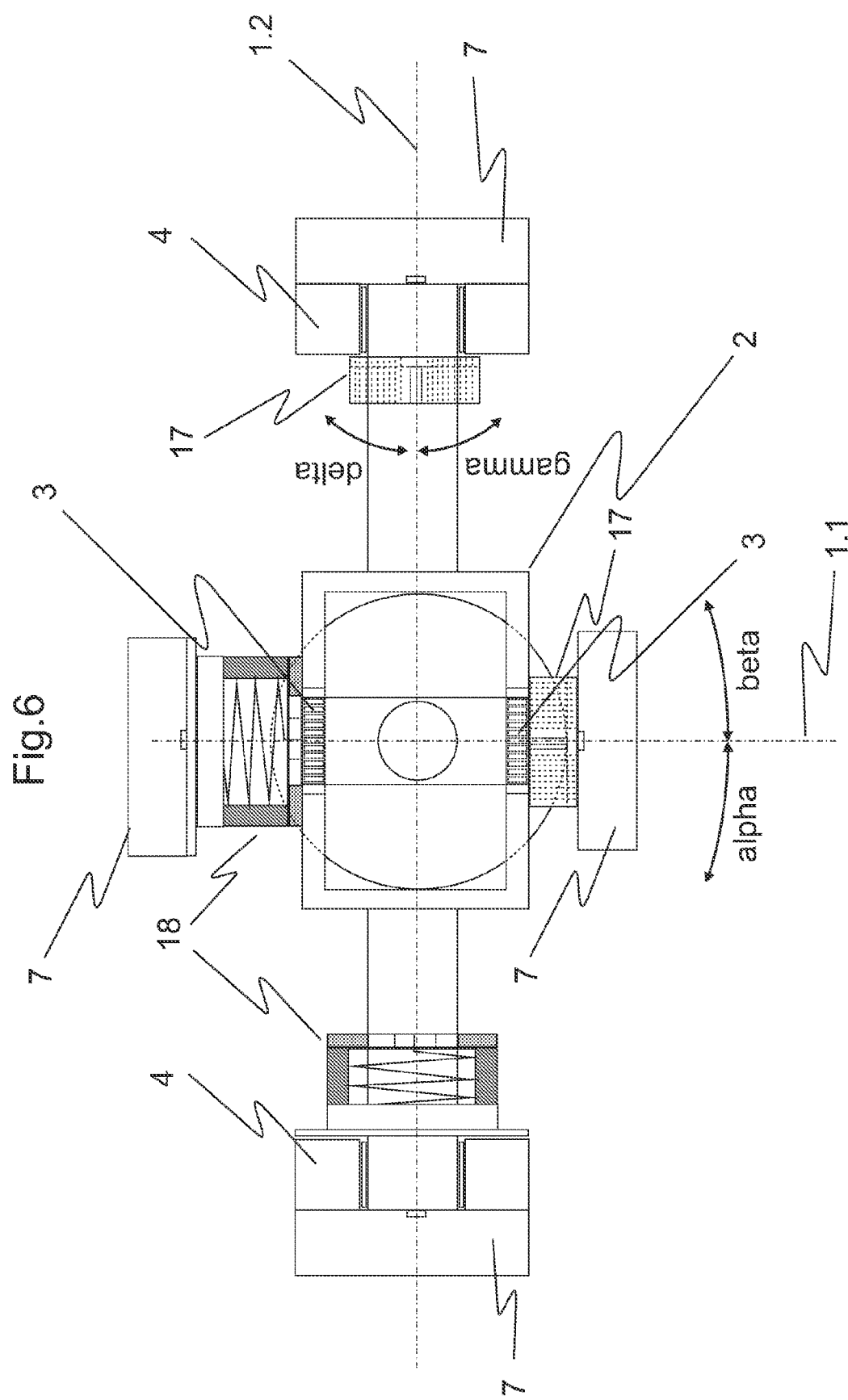
FIG. 6 is a schematic top view of an extract with the shaft and the joystick of the preferred embodiment of the counterbalanced control stick system according to any of FIGS. 2-4 of the invention.

According to FIG. 6 corresponding features are referred to with the references of FIG. 1-5. One supplemental rotational spring 18 is coaxially mounted on the shaft 2 and a further supplemental rotational spring 18 is mounted on the axle 2.1 next to the outside of the ball-, roller- or journal-bearing 3 of the counterbalanced control stick system.

Next to the bearing 4 opposed to the supplemental rotational spring 18 is coaxially mounted on the shaft 2 a bent leaf spring 17. A further bent leaf spring 17 is mounted coaxially to said joystick axis 1.1 next to the outside of the ball-, roller- or journal-bearing 3 and opposite to the further supplemental rotational spring 18 and sensor means 7 are provided coaxially outside the further supplemental rotational spring 18 or the bent leaf spring 17 to detect any angular movements "alpha", "beta" of said joystick 1 relative to said joystick axis 1.1.

Figure 7:
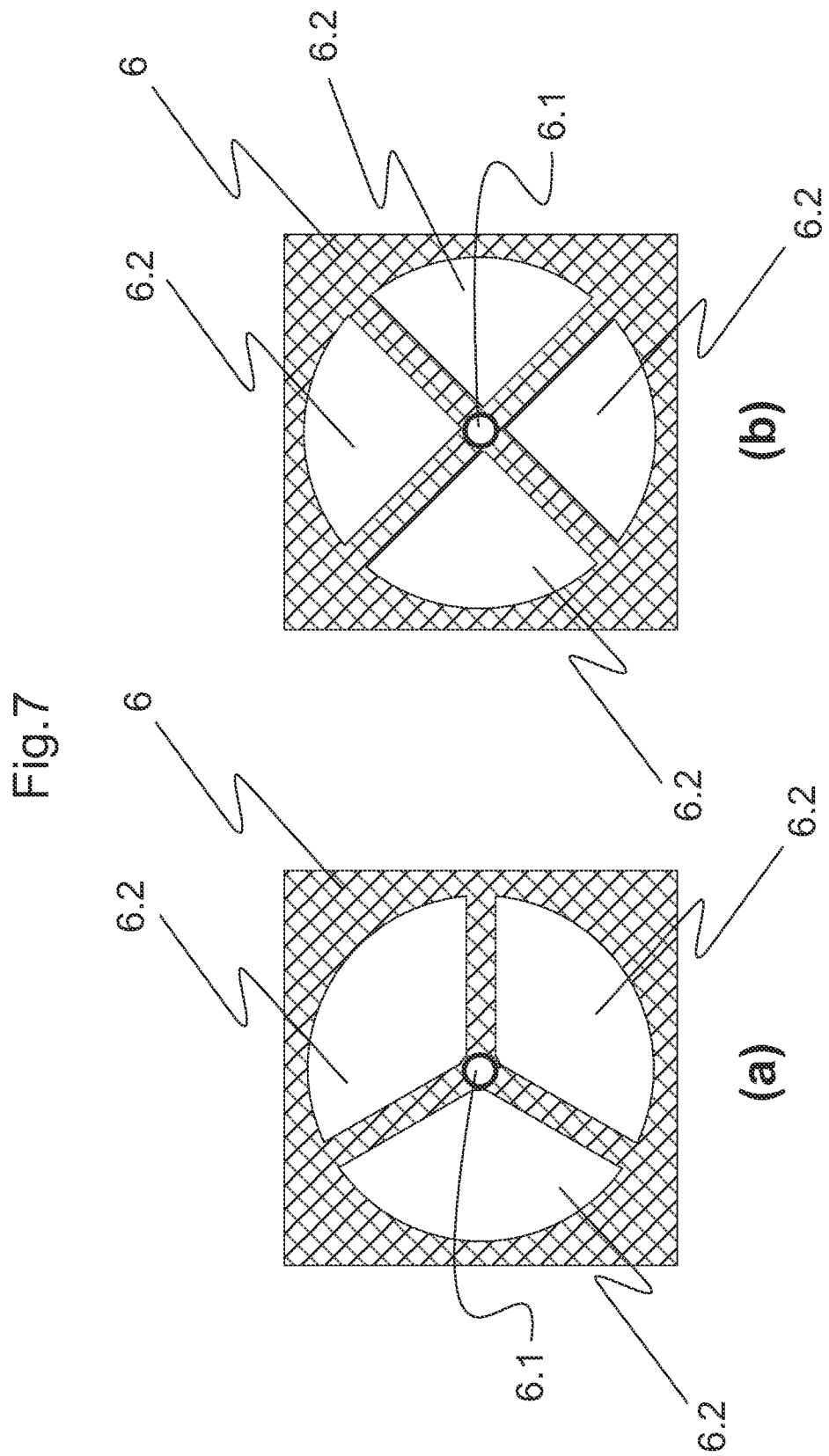
FIGS. 7a, 7b are respective top views of an extract of preferred embodiments of the counterbalanced control stick system according to any of FIGS. 2, 4 of the invention.

According to FIG. 7 corresponding features are referred to with the references of FIG. 2, 4. A first embodiment of the rectangular anchored element 6 of the counterbalanced control stick system is provided with the central point 6.1 for fixing the redundancy spring 5 to said anchored element 6. The first embodiment of the anchored element 6 is provided with three equal passages 6.2 for three helical springs 10 to the fixing points 11.1 of plate 11 while a second embodiment of the anchored element 6 is provided with four equal passages 6.2 for four helical springs 10 to the fixing points 11.1 of plate 11.

Figure 8:
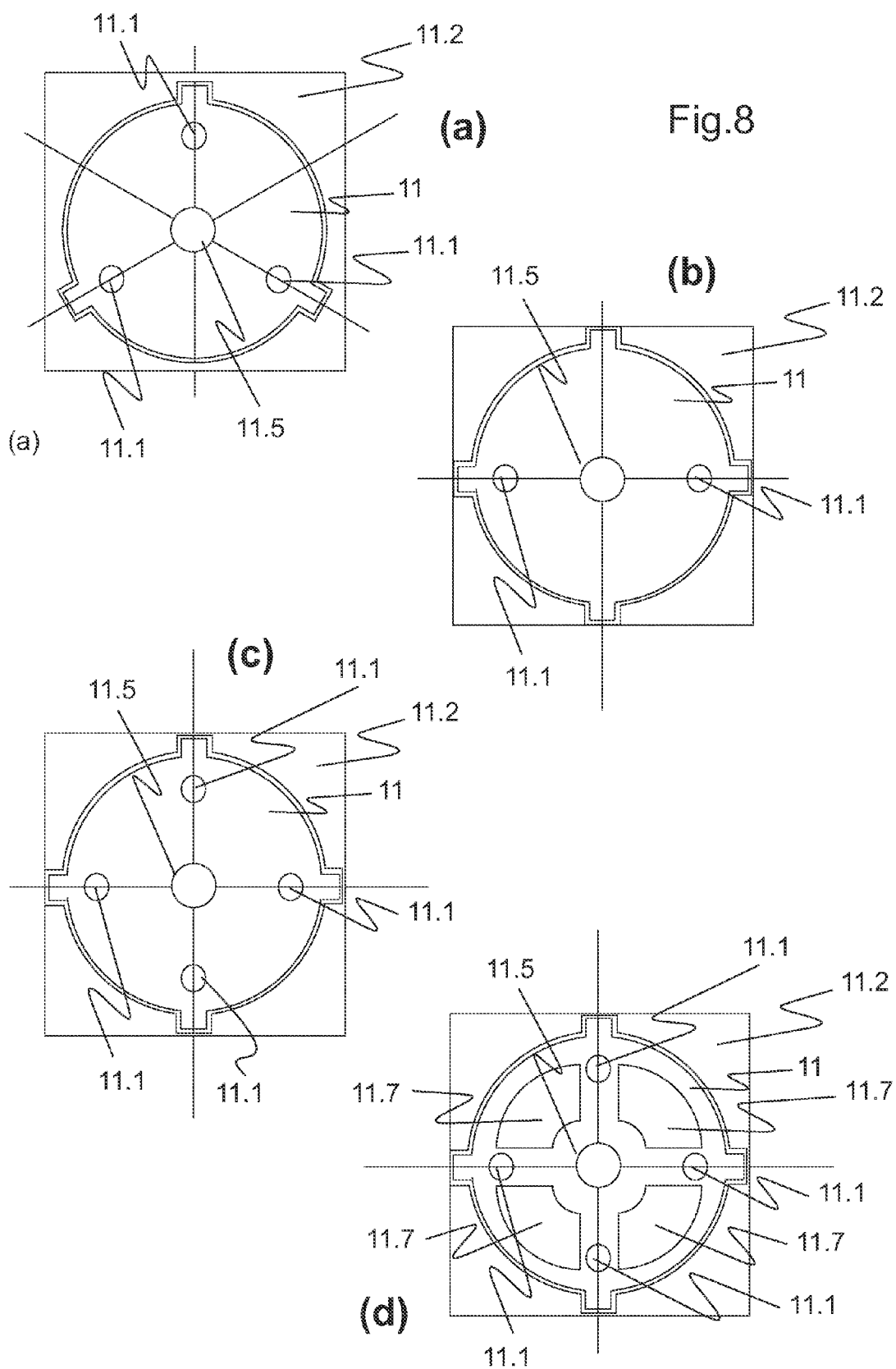
FIGS. 8a-8d are respective top views of a further extract of preferred embodiments of the counterbalanced control stick system according to any of FIGS. 1-4 of the invention.

According to FIG. 8 corresponding features are referred to with the references of FIG. 1-4. A first embodiment of the essentially circular plate 11 is provided with three equally distributed protrusions for insertion into guide rails 11.2 of the casing 22 with a rectangular cross section. Radial inside of each of the three protrusions is provided respectively one fixing point 11.1 for one of the three helical springs 10. The smooth opening 11.5 for the central screw 12 is situated in the middle of the movable plate 11.

A second embodiment of the essentially circular plate 11 is provided with four equally distributed protrusions for insertion into the corresponding numbers of guide rails 11.2 of the casing 22. Radial inside of each of the four protrusions is provided respectively one fixing point 11.1 for one of the four helical springs 10. The smooth opening 11.5 for the central screw 12 is situated in the middle of the movable plate 11.

A third embodiment of the essentially circular plate 11 is provided with four equally distributed protrusions for insertion into the corresponding numbers of guide rails 11.2 of the casing 22 while only two fixing points 11.1 are provided radial inside of two opposed guide rails 11.2 for two helical springs 10. The smooth opening 11.5 for the central screw 12 is situated in the middle of the movable plate 11.

The functionality of a fourth embodiment of the essentially circular plate 11 is alike the functionality of the second embodiment of the essentially circular plate 11 with the essentially circular plate 11 being provided with four essentially equal cutouts 11.7 for weight reduction. The essentially circular plate 11 is made of synthetics for weight reduction.

The essentially circular plate 11.4 is provided in the middle instead of the smooth opening 11.5 with the coaxially threaded hole 11.6 adapted to the screw 12.1 of the counterbalanced control stick system.

Figure 9:
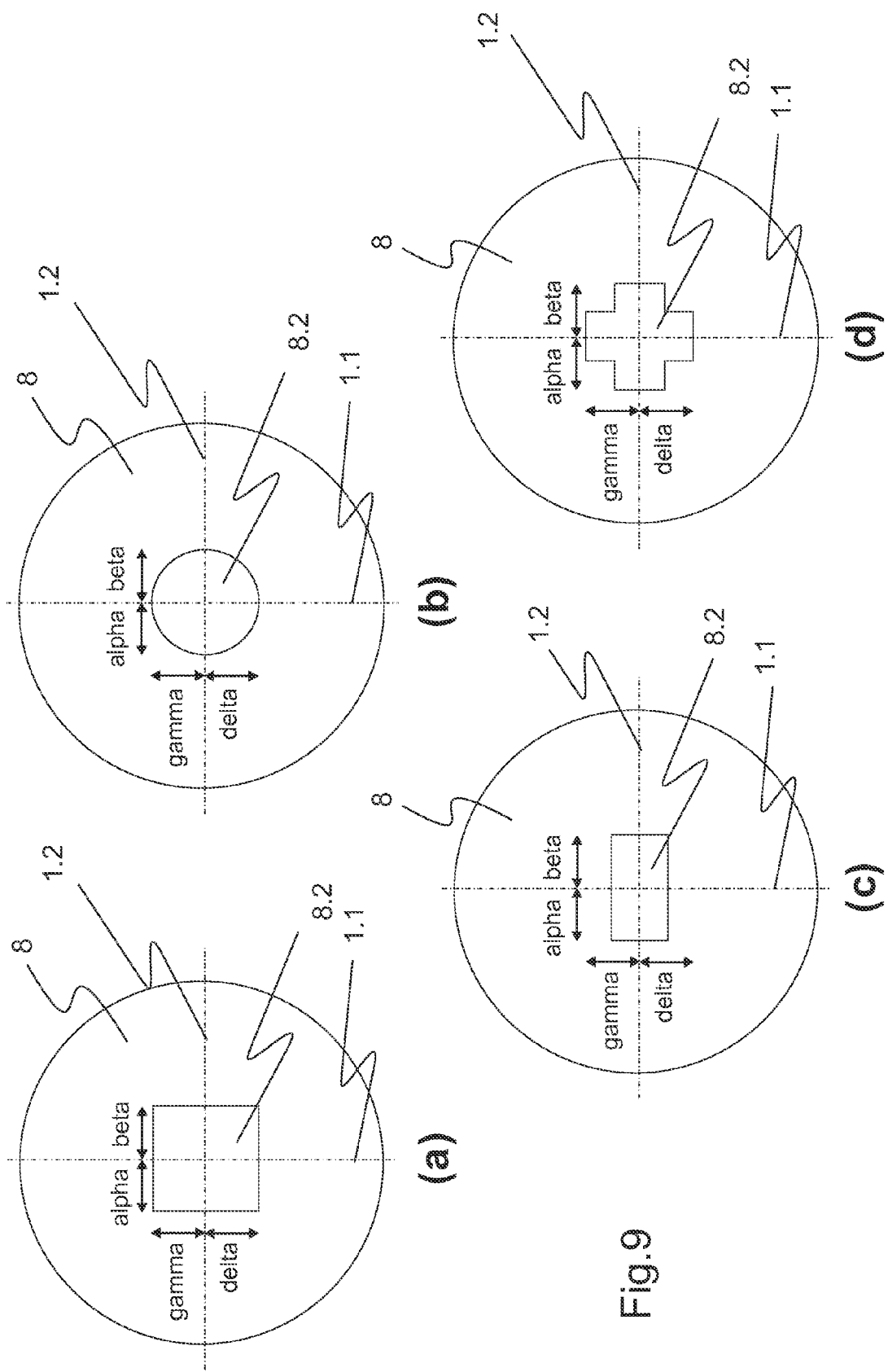
FIGS. 9a-9d are respective top views of a further extract of the preferred embodiments of the counterbalanced control stick system according to any of FIGS. 1-4 of the invention.

According to FIG. 9 corresponding features are referred to with the references of FIG. 1-4. In a first embodiment the essentially circular cover 8 is provided with a quadratic central opening 8.2, said quadratic central opening 8.2 allowing from a neutral position the respective rotations "alpha", "beta" of the joystick 1 in the direction of the shaft axis 1.2 and again from a neutral position the respective rotations "gamma", "delta" of the joystick 1 in the direction of the rotational axis 1.1, said rotations allowing the same deflections of the joystick 1 in all directions.

In a second embodiment the essentially circular cover 8 is provided with a circular central opening 8.2 allowing from a neutral position the respective rotations "alpha", "beta" of the joystick 1 in the direction of the shaft axis 1.2 and again from a neutral position the respective rotations "gamma", "delta" of the joystick 1 in the direction of the rotational axis 1.1.

In a third embodiment the essentially circular cover 8 is provided with a rectangular central opening 8.2 for the respective rotations "alpha", "beta" of the joystick 1 in the direction of the shaft axis 1.2 and again from a neutral position the respective rotations "gamma", "delta" of the joystick 1 in the direction of the rotational axis 1.1.

In a fourth embodiment the essentially circular cover 8 is provided with a cross-type central opening 8.2 limiting from a neutral position the respective rotations "alpha", "beta" of the joystick 1 exclusively in the direction of the shaft axis 1.2 and again from the neutral position the respective rotations "gamma", "delta" of the joystick 1 exclusively in the direction of the rotational axis 1.1.

According to FIG. 10 corresponding features are referred to with the references of FIG. 1-4. The quadratic central opening 8.2 of the cover 8 corresponds to the first embodiment of the essentially circular cover 8. The cover 8 is centered relative to the casing 22 with radial directed springs 21. Four radial fins 29 point inside from the casing 22 while leaving a gap each to the outer circumference of cover 8. Deflections of the joystick 1 beyond the respective rotations "alpha", "beta" in the direction of the shaft axis 1.2 or the respective rotations "gamma", "delta" in the direction of the rotational axis 1.1 are possible against the resistance of the radial springs 21 by exerting the necessary force with the joystick 1. A maximum displacement rho of the cover 8 is defined by the gap between the radial fins 29 and the outer circumference of cover 8, said maximum displacement rho limiting any possible supplementary rotations of joystick 1 in all directions.

According to FIG. 11 corresponding features are referred to with the references of FIGS. 2-4 and 6. A staggering spring 18.1 is arranged coaxially inside a bushing 18.3 of the supplemental rotational spring 18. A ring 18.2 is coaxial with the bushing 18.3. Ring 18.2 is rotated upon rotation of shaft 2 around shaft axis 1.2 and staggering spring 18.1 is turned coaxially by ring 18.2 from an angle eta till up to an angle alpha. The clearance 18.4 at an inside circumference of ring 18.2 allows free rotation of shaft 2 within an angular range of +/−eta without any reactions from the staggering spring 18.1. Subsequent further rotation of shaft 2 is met by increasing reaction forces from the staggering spring 18.1, resulting in a tactile feedback at the joystick 1 linked to said shaft 2.

According to FIG. 12 corresponding features are referred to with the references of FIGS. 2-4 and 6. An embodiment of the bent leaf spring 17.2 is held by support 20 attached to bearing 4. The outer circumference of shaft 2 is equipped with a saw-tooth surface 17.1 as a gear pattern interacting with the bent leaf spring 17.2 upon clockwise or counter-clockwise rotation of shaft 2 with an angle greater phi. Any subsequent further rotation of shaft 2 beyond angle phi results in a tactile feedback at the joystick 1 linked to said shaft 2.

FIG. 13 shows a modification of the saw-tooth surface 17.1 as a gear pattern for the provision of an angle phi causing an initial resistance against any rotation from the neutral position, in which the bent leaf spring 17.2 is definitely snapped into the saw-tooth surface 17.1. A relaxation follows upon overcoming a start resistance against rotation of shaft 2. Upon further clockwise or counter-clockwise rotation of shaft 2 to an angle equal phi the resistance against further rotation of shaft 2 increases again and any subsequent further rotation of shaft 2 beyond angle phi results in a tactile feedback to the joystick 1, when bent leaf spring 17.2 further snaps into the saw-tooth surface 17.1 of said shaft 2.

Figure 14:
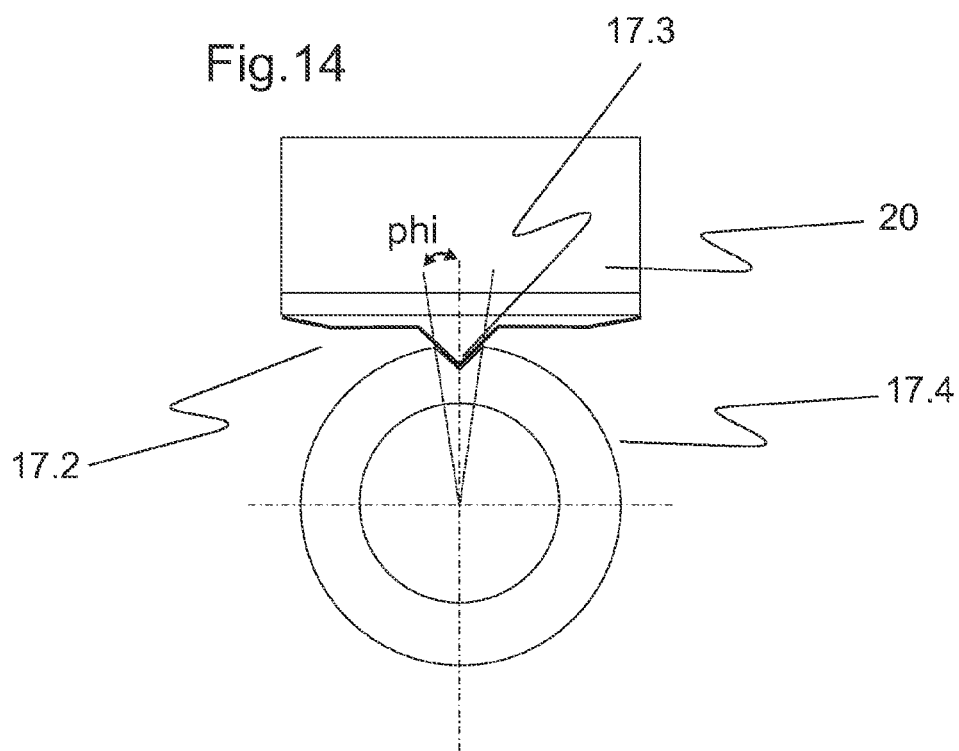
FIG. 14 is a lateral view of a further modification of the further extract of the preferred embodiments of the counterbalanced control stick system according to any of FIGS. 2-4 and FIG. 6 of the invention.

FIG. 14 shows a further modification of the outer circumference of shaft 2 with a surface 17.4 as a gear pattern for the provision of an angle phi. An initial resistance against any rotation from the neutral position has to be overcome against the bent leaf spring 17.2, said resistance increasing linearly till an angle equal phi. No further reaction from the bent leaf spring 17.2 has to be overcome for any further rotation of shaft 2 beyond angle phi and thus there is no tactile feedback from any further rotation of shaft 2 beyond angle phi.

According to FIGS. 15*a*, 15*b* corresponding features are referred to with the references of FIG. 1-4. The joystick 1 is provided with a shaker/vibrator 9 adjacent to a handgrip section 23 on a first side relative to said shaft 2. Electric power can be applied to the shaker/vibrator 9 providing vibrations with a specific frequency with specific amplitudes at the handgrip section 23 for tactile feedback. The joystick 1 is shown with no amplitude and alternatively with an amplitude a provided by the shaker/vibrator 9.

FIG. 16 shows a graph of a force-angular travel relation for any rotation around the rotational axis 1.1 of the counterbalanced control stick system according to FIG. 1 and FIG. 9*a*. Said force-angular travel relation is essentially linear along the angular ranges alpha and beta. A graph of the force-angular travel relation for any rotation around the shaft axis 1.2 of the counterbalanced control stick system according to FIG. 1 and FIG. 9*a* is more or less alike.

FIG. 17 shows a graph of a force-angular travel relation for any rotation around the rotational axis 1.1 of the counterbalanced control stick system according to FIG. 1 and with a cover 8 corresponding to FIG. 10. Said force-angular travel relation is essentially linear along most of the angular ranges alpha-rho and beta-rho. Towards the end of the angular ranges alpha an additional resilient force from the radial springs 21 is superposed to the effort needed for angle rho. A graph of the force-angular travel relation for any rotation around the shaft axis 1.2 of the counterbalanced control stick system according to FIG. 1 and FIG. 10 is more or less alike.

FIG. 18 shows a typical graph of a force-angular travel relation for any rotation around the rotational axis 1.1 of the counterbalanced control stick system according to FIG. 2 and with a cover 8 corresponding to FIG. 10. Subsequent to an initial angular range phi the force from the supplemental rotational spring 18 in a range iota is superposed to the basic forces from the helical springs 10, 10.1 and/or 10.2 in the angular range eta. In the angular range rho the forces of the radial springs 21 of cover 8 are added. A corresponding force-angular travel relation applies to counterbalanced control stick systems according to FIGS. 1 and 2 if the moves of the joystick 1 are limited by a cover 8 corresponding to FIG. 9d. Corresponding force-angular travel relations apply as well to counterbalanced control stick systems according to FIG. 3. Appropriate dynamic control of the motor 31 allows application of said typical graph of a force-angular travel relation to the counterbalanced control stick system according to FIG. 4.

According to FIG. 19 a system architecture of a counterbalanced control stick system according to FIGS. 1-4 is provided with a control device 24. Signals generated by the rotation angle sensors 7 are supplied to electronics 25, digitized and differing detected values are harmonized, if applicable. Further electronics 27 are needed for a counterbalanced control stick system according to FIG. 4 to provide the control signals to the motor 31 and register any feedback from said motor 31, if applicable. A control computer 26 processes the data from electronics 25 and further electronics 27 to control data for transfer to actuators 28 and feedback to the further electronics 27, if applicable.

According to FIG. 20 the joystick 1 of the counterbalanced control stick system is held at the cross point of the rotational axis 1.1 with the shaft axis 1.2. At a gravity center 30 the mass m of the joystick 1 is centered. Said gravity center 30 has the distance $l_1$ from the cross point of the rotational axis 1.1 with the shaft axis 1.2 and said cross point has the distance $l_2$ from any of the helical springs 5, 10 and 10.1. With an assumed horizontal acceleration $a_{max}$ for the counterbalanced control stick system the pretension force F of the helical springs 5, 10 and 10.1 to the joystick 1 results as:

$$F > m \times a_{max} \times l_1/l_2.$$

Said pretension force F of the helical springs 5, 10 and 10.1 to the joystick 1 is normally above 15 N for helicopters.

REFERENCE LIST

1 Joystick
1.1 rotational axis
1.2 shaft axis
2 Shaft
2.1 axle
2.2 cage
3 ball-, roller- or journal-bearing
4 bearings
5 redundancy spring
6 anchored element
6.1 central point
6.2 passages
7 sensor means
8 cover
8.1 longitudinal axis
8.2 central opening
9 shaker/vibrator
10 helical springs
10.1 decoupling springs
10.2 further helical springs
11 adjustable plate
11.1 fixing points
11.2 guide rails
11.3 shaft point
11.4 plate
11.5 smooth opening
11.6 threaded hole
11.7 cut outs
12 central screw
12.1 screw
13 plate
14 jam nut
15 head
16 common central axis
17 bent leaf spring
17.1 saw-tooth surface
17.4 surface
18 rotational spring
18.1 staggering spring
18.2 ring
18.3 bushing
18.4 clearance
19 housing
20 support
21 radial directed springs
22 casing
23 handgrip section
24 control device
25 electronics
26 control computer
27 further electronics
28 actuators
29 radial fins
30 gravity center
31 motor

What is claimed is:

1. A counterbalanced control stick system for a vehicle, particularly a counterbalanced control stick system for an air vehicle, comprising:
a shaft with a shaft axis rotationally mounted in a casing;
a joystick with a transversal axis, said joystick being pivotally mounted relative to said rotational shaft axis for angular movements of said joystick relative to said shaft axis, said joystick being provided with a handgrip section on a first side of said shaft and an opposed section on a second side opposed to said first side relative to said shaft, said opposed section of said joystick being linked by resilient means to adjustable fixing points, characterized in that a movable plate is provided, said movable plate being offset from the joystick and movable relative to said casing and in that the adjustable fixing points are controlled by means of said movable plate;
at least one angle sensor is provided at the shaft and/or the joystick respectively for detection of any angular moves of the shaft relative to the casing and/or of the joystick relative to the shaft; and
electronics are provided to which signals generated by the at least one angle sensor are supplied and where the signals are digitized and differing detected values are harmonized,
wherein a supplemental rotational spring and/or a bent leaf spring is/are associated to the shaft, and wherein a gear pattern is provided on respective parts of the rotational shaft interacting with the supplemental rotational spring and/or the bent leaf spring.

2. The counterbalance control stick system according to claim 1, wherein a screw is provided, said screw controlling the movement of the plate relative to the joystick.

3. The counterbalance control stick system according to claim 2, wherein a motor is provided, said motor driving the screw controlling the movement of the plate relative to the joystick.

4. The counterbalance control stick system according to claim 1, wherein further angle sensors are provided at the shaft and/or the joystick.

5. The counterbalance The control stick system according to claim 1, wherein the resilient means are springs extending from said opposed section of said joystick to the adjustable fixing points.

6. The counterbalance control stick system according to claim 1, wherein at least one decoupling spring is provided, said at least one decoupling spring extending from said opposed section of said joystick to at least one shaft point that is fix relative to the shaft and said at least one shaft point is coupled in series to further resilient means, said further resilient means being adjustable by means of said movable plate.

7. The counterbalance control stick system according to claim 6, wherein said resilient means, decoupling spring or further resilient means are two, three or four helical springs.

8. The counterbalance control stick system according to claim 7, wherein said resilient means or further resilient means are two pairs of springs each pair associated to an angular movement of said joystick either relative to the shaft axis and/or with the shaft axis.

9. The counterbalance control stick system according to claim 1, wherein an anchored element is provided on top of said movable plate and said resilient means is a redundancy spring linked with its first end to said opposed section of said joystick and with its other end to a central point of said anchored element.

10. The counterbalance control stick system according to claim 1, wherein a cover is provided on the casing with at least one passage, said passage being provided with at least one soft stop along its inner circumference.

11. The counterbalance control stick system according to claim 1, wherein the joystick is provided with an electrically driven vibrator/shaker.

12. The counterbalance control stick system according to claim 1, further comprising a control device provided to supply signals generated by the at least one angle sensor to electronics and further electronics to provide control signals to a motor and register any feedback from said motor and a control computer to process data from the electronics and the further electronics to control data for transfer to actuators and feedback to the further electronics.

13. A counterbalanced control stick system for a vehicle, particularly a counterbalanced control stick system for an air vehicle, comprising:
 a shaft with a shaft axis rotationally mounted in a casing;
 a joystick with a transversal axis, said joystick being pivotally mounted relative to said rotational shaft axis for angular movements of said joystick relative to said shaft axis, said joystick being provided with a handgrip section on a first side of said shaft and an opposed section on a second side opposed to said first side relative to said shaft, said opposed section of said joystick being linked by resilient means to adjustable fixing points, wherein a movable plate is provided, said movable plate being offset from the joystick and movable relative to said casing and in that the adjustable fixing points are controlled by means of said movable plate;
 at least one angle sensor is provided at the shaft and/or the joystick respectively for detection of any angular moves of the shaft relative to the casing and/or of the joystick relative to the shaft;
 a supplemental rotational spring and/or a bent leaf spring is/are associated to the shaft; and
 a gear pattern is provided on respective parts of the rotational shaft interacting with the supplemental rotational spring and/or the bent leaf spring.

14. The counterbalance control stick system according to claim 13, wherein the resilient means are springs extending from said opposed section of said joystick to the adjustable fixing points.

15. The counterbalance control stick system according to claim 13, wherein at least one decoupling spring is provided, said at least one decoupling spring extending from said opposed section of said joystick to at least one shaft point that is fix relative to the shaft and said at least one shaft point is coupled in series to further resilient means, said further resilient means being adjustable by means of said movable plate.

16. The counterbalance control stick system according to claim 13, wherein an anchored element is provided on top of said movable plate and said resilient means is a redundancy spring linked with its first end to said opposed section of said joystick and with its other end to a central point of said anchored element.

17. A counterbalanced control stick system for a vehicle, particularly a counterbalanced control stick system for an air vehicle, comprising:
 a shaft with a shaft axis rotationally mounted in a casing;
 a joystick with a transversal axis, said joystick being pivotally mounted relative to said rotational shaft axis for angular movements of said joystick relative to said shaft axis, said joystick being provided with a handgrip section on a first side of said shaft and an opposed section on a second side opposed to said first side relative to said shaft, said opposed section of said joystick being linked by resilient means to adjustable fixing points, wherein a movable plate is provided, said movable plate being offset from the joystick and movable relative to said casing and in that the adjustable fixing points are controlled by means of said movable plate;
 at least one angle sensor is provided at the shaft and/or the joystick respectively for detection of any angular moves of the shaft relative to the casing and/or of the joystick relative to the shaft;
 digitizer to which signals generated by the at least one able sensor are supplied and where the signals are digitized and differing detected values are harmonized,
 a supplemental rotational spring and/or a bent leaf spring is/are associated to the shaft; and
 a gear pattern provided on respective parts of the rotational shaft interacting with the supplemental rotational spring and/or the bent leaf spring.

18. The counterbalance control stick system according to claim 17, wherein a screw is provided, said screw controlling the movement of the plate relative to the joystick.

19. The counterbalance control stick system according to claim 18, wherein a motor is provided, said motor driving the screw controlling the movement of the plate relative to the joystick.

20. The counterbalance control stick system according to claim 17, wherein the joystick is provided with an electrically driven vibrator/shaker.

* * * * *